United States Patent [19]

Kuszyk et al.

[11] Patent Number: 5,637,541

[45] Date of Patent: *Jun. 10, 1997

[54] ALUMINUM NITRIDE REFRACTORY MATERIALS AND METHODS FOR USING THE SAME

[75] Inventors: Jack A. Kuszyk, Lincoln University, Pa.; John P. Biel, Jr., Elkton, Md.

[73] Assignee: Lanxide Technology Company, LP, Newark, Del.

[*] Notice: The portion of the term of this patent subsequent to May 14, 2013, has been disclaimed.

[21] Appl. No.: 167,941

[22] PCT Filed: Jun. 18, 1992

[86] PCT No.: PCT/US92/05206

§ 371 Date: Dec. 21, 1993

§ 102(e) Date: Dec. 21, 1993

[87] PCT Pub. No.: WO92/22517

PCT Pub. Date: Dec. 23, 1992

Related U.S. Application Data

[63] Continuation-in-part of Ser. No. 717,553, Jun. 19, 1991, abandoned.

[51] Int. Cl.$^6$ .................................................. C04B 35/582
[52] U.S. Cl. .................. 501/97.2; 501/97.1; 501/98.4; 266/266; 428/689; 428/698; 428/699
[58] Field of Search .................. 501/96, 97, 98; 266/266; 428/689, 698, 699

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,262,763 | 7/1966 | Bechtold | 29/182.5 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,551,101 | 12/1970 | Matsuo et al. | 23/192 |
| 3,789,096 | 1/1974 | Church | 264/60 |
| 3,864,154 | 2/1975 | Gazza et al. | 29/123 B |
| 3,949,804 | 4/1976 | Kaneko et al. | 164/62 |
| 3,973,977 | 8/1976 | Wilson | 106/62 |
| 4,033,400 | 7/1977 | Gurwell et al. | 164/98 |
| 4,573,616 | 3/1986 | Shapland | 222/600 |
| 4,597,514 | 7/1986 | Thrower | 222/600 |
| 4,828,008 | 5/1989 | White et al. | 164/66.1 |
| 4,918,034 | 4/1990 | Weinstein et al. | 501/87 |
| 4,923,832 | 5/1990 | Newirk et al. | 501/128 |
| 4,996,176 | 2/1991 | Newkirk et al. | 501/127 |
| 5,328,878 | 7/1994 | Kuszyk et al. | 501/96 |
| 5,516,734 | 5/1996 | Kuszyk et al. | 501/98 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 9/1986 | European Pat. Off. . |
| 0245192 | 11/1987 | European Pat. Off. . |

OTHER PUBLICATIONS

"Oxidation of Molten Aluminum Alloys, Reaction with Refractories" –M. Drouzy and M. Richard –Mar. 1974 Founderie, France No. 332 pp. 121–128.

(List continued on next page.)

*Primary Examiner*—Karl Group
*Attorney, Agent, or Firm*—Jeffrey R. Ramberg

[57] ABSTRACT

The present invention broadly relates to novel aluminum nitride matrix ceramic composite bodies for use as refractory materials and methods for making the same. The refractory materials are useful in environments which are corrosive, erosive, abrasive and/or which generate thermal shock. Such environments include furnaces, and associated apparatus which house or contact molten masses including, for example, molten metals, molten glasses, etc. The preferred method for making the aluminum nitride matrix ceramic composites comprises a directed oxidation of molten metal.

34 Claims, 3 Drawing Sheets

OTHER PUBLICATIONS

"Refractories for Aluminum Alloy Melting Furnaces" –B. Clavaud and V. Jost –Sep., 1980 –Lillian Brassinga (from French) Jan. 1985.

E. Luhrsen, M. Oberbach, and H. G. Stallmann, "Refractories for Continuous Casting of Steel–Requirements, Current State, and Developments", presented at Continuous Casting Symposium 1985, May 22–24, 1985, London, United Kingdom.

Jo Isenberg–O'Loughlin, "Getting More Out of Gates and Valves", Metal Producing, May 1986, pp. 31–35.

K. Sugita, M. Ikeda, S. Tamura "Microstructural Improvements in Slide Gate Plates for Steel Pouring", presented at 83rd Annual Meeting of the American Ceramic Society, Cincinnati, OH, May 4, 1982.

K. M. Taylor and Camilie Lenie, "Some Properties of Aluminum Nitride", Journal of the Electrochemical Society, Apr. 1960, pp. 308–314.

George Long and L. M. Foster, "Aluminum Nitride, A Refractory for Aluminum to 2000° C", Journal of the American Ceramic Society, Feb. 1959, Vo. 42, No. 2 pp. 53–59.

Marija Trontelj and Drago Kolar "Wetting of Aluminum Nitride by Nickel Alloys", Journal of the American Ceramic Society –vol. 61, No. 5–6, pp. 204 and 207 (no date).

G. H. Schiroky et al., "Structural Ceramics You Can Count On", Machine Design, pp. 48–51, Jan. 10, 1991.

ALUMINUM NITRIDE REFRACTORY MATERIALS AND METHODS FOR USING THE SAME

This is a 371 of PCT/US92/05206, filed Jun. 18, 1992, published as WO92/22517, Dec. 23, 1992, and also a CIP of application Ser. No. 07/717,553, filed Jun. 19, 1991, now abandoned.

TECHNICAL FIELD

The present invention broadly relates to novel aluminum nitride matrix ceramic composite bodies for use as refractory materials and methods for making the same. The refractory materials are useful in environments which are corrosive, erosive, abrasive and/or which generate thermal shock. Such environments include furnaces, and associated apparatus which house or contact molten masses including, for example, molten metals, molten glasses, etc. The preferred method for making the aluminum nitride matrix ceramic composites comprises a directed oxidation of molten metal.

BACKGROUND ART

Ceramics and ceramic composites have been utilized as refractory materials in a number of different applications. It has been found that ceramic and ceramic composite refractories can be used as many different components for applications which require, among other things, good resistance to thermal shock, good corrosion, abrasion and erosion resistance, etc. For example, ceramic and ceramic composite materials have been utilized as liners in molten glass furnaces and molten metal furnaces, as well as in apparatus associated with such furnaces (e.g., apparatus which direct or constrict the flow of molten fluids from one point to another).

Exemplary uses for ceramic materials in molten metal furnace and molten metal transfer systems include furnace linings, slide gates, sub-entry nozzles, ladle shrouds, tundishes, etc. Many metal manufacturing processes (including steel manufacturing processes) have recently been changed from traditional batch processes to some type of continuous process for reasons of economy and productivity. However, these continuous processing methods place extreme requirements upon the materials which are in contact with the static or flowing molten materials. For example, in the steel industry, slide gate systems, which are used for controlling the flow of molten metal from a large chamber (e.g., a furnace) into a smaller chamber (e.g., a mold), have been known for many years. However, only recently certain materials have been manufactured to meet the necessary mechanical/physical requirements imposed by such systems. Generally, slide gate systems include some type of rotor design which consists of, for example, a fixed nozzle attached to and within a moveable plate. The flow of molten metal from a ladle is controlled by moving the moveable plate to fully or partially aligned openings. When filling the ladle, and during shut off, the openings are misaligned. The advantage which stems from the use of a slide gate in continuous metal casting is that the conventional stopper rod system is eliminated. Specifically, in conventional stopper rod systems difficulties were encountered in stopping and/or modulating molten metal flow through an opening. Often the conventional stopper rod systems were not completely successful in terminating the flow of molten metal therethrough. However, even though slide gate systems have been achieving great successes in improving continuous casting of molten metals, the stringent requirements placed upon the materials for use as slide gates have resulted in many problems for the material design engineer. Accordingly, the need for new and better materials continues.

To date, common materials for use in slide gate systems include tar-impregnated alumina materials, fired-magnesia materials, etc. However, these materials suffer from many material deficiencies such as, for example, certain metals may corrode the bonding media or matrix which is utilized to hold together the refractory. Additionally, conventional materials may not possess the desired combination of thermal shock resistance, corrosion resistance, erosion resistance, abrasion resistance, and/or strength which permit the materials to function for a sufficient amount of time to achieve the economies and efficiencies needed in modern manufacturing operations. Accordingly, a need exists to develop a material which exhibits corrosion resistance, erosion resistance, thermal shock resistance, abrasion resistance, sufficient strength, etc., to withstand the severe environment to which such materials are exposed in molten metals operations.

Similar corrosion, erosion, abrasion, thermal shock, etc., problems exist in the continuous manufacture of glasses. Specifically, glasses typically contain highly corrosive media (e.g., calcia, soda, magnesia, fluorides, chlorides, etc.) which may attack even the best ceramic materials. Moreover, glass producing operations also create severe thermal shock conditions as loll as highly erosive and abrasive conditions. Accordingly, the material engineer is also faced with difficult material design/fabrication problems in designing materials for use in the glass industry.

The present invention satisfies the above-discussed needs by providing materials which are useful in metal production and glass production industries. Specifically, the materials of the present invention can be used as refractories for direct contact with, for example, molten steel, molten aluminum, molten copper, molten bronze, molten iron, etc. Similar refractories can also be utilized for direct contact with molten glasses. Moreover, the refractory materials of the present invention have substantial erosion and abrasion resistance which permit, in many applications, the refractory materials to be in direct contact with each other and to be in sliding engagement with at least a portion of another surface of another refractory material (e.g., moveable parts of a slide gate for use in molten steel applications).

DESCRIPTION OF COMMONLY OWNED U.S. PATENTS AND U.S. PATENT APPLICATIONS

The subject matter of this application is related to that of several Commonly Owned Patents and Commonly Owned and Copending Patent Applications. Particularly, these Patents and Patent Applications describe novel methods for making ceramic and ceramic matrix composite materials (hereinafter sometimes referred to as "Commonly Owned Ceramic Matrix Patent Applications and Patents").

A novel approach to the formation of ceramic materials is disclosed generically in Commonly Owned U.S. Pat. No. 4,713,360, which issued on Dec. 15, 1987, in the names of Marc S. Newkirk et al. and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials", a European counterpart to which was published in the EPO on Jan. 22, 1986.

A novel method for producing a self-supporting ceramic composite by growing an oxidation reaction product form a parent metal into a permeable mass of filler is disclosed in commonly owned and U.S. Pat. No. 5,420,085, issued May 30, 1995, which is a continuation of U.S. patent application Ser. No. 07/811,895, filed Dec. 20, 1991 (and now abandoned) which was a continuation of U.S. patent application Ser. No. 07/443,733, filed Nov. 30, 1989 (and now abandoned), and entitled "Method of Making Composite Articles Having Embedded Filler", which was a continuation-in-part of commonly owned U.S. patent application Ser. No. 07/415,180, filed Sep. 29, 1989 (and now abandoned), which was a divisional U.S. Pat. No. 4,916,113, issued Apr. 10, 1990, and entitled "Methods of Making Composite Articles Having Embedded Filler" which is a continuation of U.S. Pat. No. 4,851,375, issued Jul. 25, 1989, and entitled "Composite Ceramic Articles and Methods of Making the Same", all in the names of Marc S. Newkirk, et al.

A method for producing ceramic composite bodies having a predetermined geometry or shape is disclosed in Commonly Owned U.S. Pat. No. 5,017,526, which issued on May 21, 1991, in the names of Marc S. Newkirk et al., a European counterpart to which was published in the EPO on Jan. 22, 1986. In accordance with the method in this U.S. patent application, the developing oxidation reaction product infiltrates a permeable preform of filler material in a direction towards a defined surface boundary.

It was discovered that high fidelity is more readily achieved by providing the preform with a barrier means, as disclosed in Commonly Owned U.S. Pat. No. 5,236,786, issued Aug. 17, 1993, entitled "Shaped Ceramic Composites with a Barrier", which is a continuation of U.S. patent application Ser. No. 07/295,488, filed Jan. 10, 1989 (and now abandoned), which was a continuation of U.S. Pat. No. 4,923,832, which issued May 8, 1990, both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. patent application Ser. No. 07/763,681, which is a continuation of U.S. Pat. No. 5,051,382, which issued Sep. 24, 1991, which was a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

The feeding of additional molten parent metal from a reservoir has been successfully utilized to produce thick ceramic matrix composite structures. Particularly, as disclosed in Commonly Owned U.S. Pat. No. 4,918,034, issued Apr. 17, 1990, which is a continuation-in-part of U.S. Pat. No. 4,900,699, issued Feb. 13, 1990, both in the names of Marc S. Newkirk et al., and entitled "Reservoir Feed Method of Making Ceramic Composite Structures and Structures Made Thereby", a European counterpart to which was published in the EPO on Mar. 30, 1988, the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Commonly Owned U.S. Pat. No. 5,017,533, issued on May 21, 1992, which in turn was a continuation of U.S. patent application Ser. No. 06/908,454, filed Sep. 17, 1986 (and now abandoned), both of which are in the names of Marc S. Newkirk et al.; and entitled "Method for In Situ Tailoring the Metallic Component of Ceramic Articles and Articles Made Thereby".

Moreover, U.S. Pat. No. 5,066,618, issued on Nov. 19, 1991, which was a continuation of U.S. patent application Ser. No. 07/269,152, filed Nov. 9, 1988 (and now abandoned), which was a continuation of U.S. patent application Ser. No. 07/152,518 (which issued as U.S. Pat. No. 4,818,734, issued Apr. 4, 1989), in the names of Robert C. Kantner et al., which was a Continuation-in-Part Application of the above-mentioned Ser. No. 06/908,454, having the same title and also being Commonly Owned. These Patents and the above-mentioned application Ser. No. 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product (e.g., aluminum nitride) to form a body of molten parent metal which reacts upon contact with an oxidant (e.g., a nitrogenous atmosphere) to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product when contacted with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and nitrogen as the oxidant, dopants such as strontium, silicon, nickel and magnesium, to name but a few of a larger class of dopant materials, can be alloyed with aluminum, and the created growth alloy is utilized as the parent metal. The resulting oxidation reaction product of such a growth alloy, in the case of using nitrogen as an oxidant, comprises aluminum nitride.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Novel processing techniques, and the novel bodies which are produced thereby, are disclosed in Copending and Commonly Owned U.S. patent application Ser. No. 07/763,476, filed on Sep. 20, 1991, which is a continuation of U.S. patent application Ser. No. 07/414,198, filed on Sep. 28, 1989 (and now abandoned), which in turn was a continuation of U.S. Pat. No. 4,874,569, which issued on Oct. 17, 1989, all of which are in the names of Jack A. Kuszyk et al., and are entitled "Ceramic Composite and Methods of Making The Same." These patent and patent applications disclose the importance of utilizing an aluminium parent metal alloy containing at least about 1 weight percent zinc for the formation of ceramic composite bodies which are used as refractory bodies.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

SUMMARY OF THE INVENTION

The present invention relates to novel aluminum nitride matrix ceramic composite refractory materials and preferred methods for making the same. The refractory materials are useful in applications which require high resistance to corrosion, erosion, abrasion, and thermal shock. In some instances, it is necessary for the materials to be resistive to detrimental oxidation. Such environments are typically found in molten metal production and glass production industries.

Preferred refractory materials for use in these environments include ceramic composites which utilize an aluminum nitride matrix that embeds a selected filler material. Specifically, it has been discovered that a synergism can be achieved between certain filler materials when embedded by an aluminum nitride matrix. The resultant aluminum nitride matrix ceramic composite materials contain never before obtainable, in a single material, combination of properties such as high corrosion resistance, high erosion resistance, high thermal shock resistance, high abrasion resistance, etc. These desirable properties should be achievable by any number of conventional processing techniques; however, the preferred technique for producing these bodies comprises the directed metal oxidation of molten aluminum metal in the presence of a nitrogen-containing oxidant to form an aluminum nitride matrix embedding a particular filler material or combination of filler materials.

It has been discovered that a number of different filler materials are useful in combination with an aluminum nitride matrix, including but not limited to magnesium oxide particulate, titanium diboride, alumina foams, aluminum nitride particulate, etc. The particular filler material chosen in combination with an aluminum nitride matrix depends on the exact environment in which the resultant refractory composite body will be placed into service. For example, certain corrosive and/or erosive environments which require, in addition to corrosion and erosion resistance, a body which has a relatively high mechanical strength, in addition to a relatively high fracture toughness, a filler material such as a platelet-shaped titanium diboride may be a perfect selection to be used in combination with an aluminum nitride matrix. The titanium diboride platelets may have an average length of about 2–20 microns. However, in situations where a high fracture strength of a refractory is not as great an issue, then the combination of an aluminum nitride matrix and, for example, large or coarse grained (e.g., particulates having an average diameter of about 1000 microns and greater) magnesium oxide particulate may be a better combination. Thus, the specific chemical composition, morphology, size, size distribution, etc., of the filler material which is to be embedded by an aluminum nitride matrix is a function of the specific environment to which the refractory component is to be exposed.

In preferred embodiments of the invention wherein the refractory materials are produced by the directed oxidation of molten aluminum metal in the presence of a nitrogen-containing oxidant, the ability to tailor refractory composite bodies to any particular desirable application exists. Such tailorability permits the ceramic composites of the present invention to be manufactured to suit virtually any industrial need. For example, composites of the present invention can be utilized in molten metal and molten glass manufacturing processes. More specifically, the materials of the present invention are very well suited for use in the continuous manufacture of metals and glasses. Thus, the materials of the present invention are well suited for throat or exit regions of furnaces where it is necessary to control or gate the flow of a molten mass through an area into, for example, a molding apparatus. These materials are also well suited for use as liners for furnaces. With specific reference to continuous metal manufacture, the materials of the present invention are well suited for slide gates, sub-entry nozzles, ladle shrouds, tundishes, etc.

Definitions

"Active Filler", as used herein, means fillers which provide nucleation sites and/or act as catalysts for ceramic matrix formation.

"Alloy Side" as used herein refers to that side of the ceramic matrix composite which initially contacted molten metal before the oxidation reaction product of that molten metal and an oxidant infiltrated the preform or mass of filler material.

"Aluminum", as used herein, means and includes essentially pure metal (e.g., relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary or oxidizing gas (if utilized) comprising the vapor-phase oxidant that is either an inert gas or a reducing gas which is substantially non-reactive with the parent metal under the process conditions. Any oxidizing gas which may be present as an impurity in the gas(es) used should be insufficient to oxidize the parent metal to any substantial extent under the process conditions.

"Barrier" or "barrier means", as used herein, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Carcass" or "Parent Metal Carcass", as used herein, refers to any of the original body of parent metal remaining which has not been consumed during formation of the ceramic body, or the ceramic composite body, and typically, which remains in at least partial contact with the formed body. It should be understood that the carcass may also typically include some oxidized constituents of the parent metal and/or a second or foreign metal therein.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two-or three-dimensionally interconnected network. The ceramic may include various dopant elements to provide a specifically desired microstructure, or specifically desired mechanical, physical, or chemical properties in the resulting composite.

"Dopants", as used herein, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein, means either single constituents or mixtures of constituents which are substantially non-reactive with and/or of limited solubility in the parent metal) and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fillers such as carbon fibers coated with alumina or silicon carbide to protect the carbon from attack, for example, by a molten aluminum parent metal. Fillers may also include metals. For example, refractory metals such as tungsten, tantalum and molybdenum could be used as fillers.

"Growth Alloy", as used herein, means any alloy containing initially, or at some point during processing obtaining, a sufficient amount of requisite constituents to result in growth of oxidation reaction product therefrom. Growth alloy may differ from a parent metal in that the growth alloy may include constituents not present in the parent metal, but incorporated into the molten alloy during growth.

"Liquid-Phase Oxidant" or "Liquid Oxidant", as used herein, in means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the desired ceramic body, is impregnated with the oxidant (e.g., by coating or immersion in the oxidant).

A Metal "Different", as used herein, means a metal which does not contain, as a primary constituent, the same metal as the parent metal (e.g., if the primary constituent of the parent metal is aluminum, the "different" metal could have a primary constituent of, for example, nickel).

"Nitrogen-Containing Gas Oxidant", as used herein, means a particular gas or vapor in which nitrogen is the sole, predominant or at least a significant oxidizer of the parent or precursor metal under the conditions existing in the oxidizing environment utilized. The nitrogen could be molecular nitrogen (i.e., $N_2$) or could be contained in a compound such as $NH_3$.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Parent Metal", as used herein, means that metal(s) (e.g., aluminum, silicon, titanium, tin and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

A Metal "Different" from the parent metal means a metal which does not contain, as a primary constituent, the same metal as the parent metal (e.g., if the primary constituent of the parent metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for growing oxidation reaction product, such mass retaining sufficient shape integrity and green strength to provide dimensional fidelity prior to being infiltrated by the oxidation reaction product and/or parent metal. The mass should be sufficiently porous to allow: (1) the vapor-phase oxidant (if a vapor-phase oxidant is used) to permeate the preform and contact parent metal; and (2) be sufficiently permeable to accommodate development or growth of oxidation reaction product. A preform typically comprises a bonded array or arrangement of filler, either homogeneous or heterogeneous, and may be comprised of any suitable material (e.g., ceramic fibers, whiskers, etc. and/or any metal particulates, powders, fibers, whiskers, etc., and any combination thereof). A preform may exist either singularly or as an assemblage.

"Reactive Filler" means that the filler interacts with molten parent metal (e.g., is reduced by the parent metal and/or oxidation reaction product and thus modifies the composition of the parent metal and/or provides an oxidant for formation of the oxidation reaction product).

"Reservoir", as used herein, means a separate body of parent metal positioned relative to a mass of filler or a preform so that, when the metal is molten, the reservoir may flow to replenish, or in some cases to initially provide and subsequently replenish, that portion, segment or source of parent metal which is in contact with the filler or preform and infiltrating and/or reacting to form the oxidation reaction product. The reservoir may also be used to provide a metal which is different from the parent metal.

"Second or Foreign Metal", as used herein, means any suitable metal, combination of metals, alloys, intermetallic compounds, or sources of either, which is, or is desired to be, incorporated into the metallic component of a formed ceramic composite body in lieu of, in addition to, or in combination with unoxidized constituents of the parent metal. This definition includes intermetallic compounds, alloys, solid solutions or the like formed between the parent metal and a second metal.

"Solid-Phase Oxidant" or "Solid Oxidant", as used herein, means an oxidant in which the identified solid is the sole, predominant or at least a significant oxidizer of the parent or precursor metal under the conditions of the process. When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which absorb the excess heat. An example of such a suitable inert filler is one which is identical, or substantially identical, to the intended oxidation reaction product.

"Vapor-Phase Oxidant", as used herein, means an oxidant which contains or comprises a particular gas or vapor and further means an oxidant in which the identified gas or vapor is the sole, predominant or at least a significant oxidizer of the parent or precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen) as those terms are used herein and in the claims.

BRIEF DESCRIPTION OF THE DRAWINGS

The following Figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

The present invention is directed to novel aluminum nitride matrix ceramic composite bodies which are used as refractory materials, and to preferred methods for making the same. Generally, the materials of the invention are useful as refractory materials in applications which require the materials to exhibit high corrosion resistance, high erosion resistance, high abrasion resistance, as well as resistance to thermal shock. Additionally, in many environments, it is desirable for the refractory materials of the invention to be resistive to oxidation. For example, if a refractory material is heated in an oxidation-containing atmosphere, the refractory material should not degrade significantly due to any undesirable oxidation reaction which may occur. The environments to which the materials of the present invention are directed, are those environments which are typically found in continuous molten metal production industries and continuous molten glass production industries.

It has been discovered that refractory materials which comprise an aluminum nitride matrix which embeds a filler material are particularly well suited for use in the above-discussed environments. Thus, any conventional processing technique which can result in an aluminum nitride matrix embedding a filler material and the combination resulting in a synergism between the aluminum nitride matrix and the filler material, is suitable for use with the present invention. Such conventional processing techniques include traditional sintering techniques, hot pressing, hot isostatic pressing, etc. However, the preferred method for making the refractory composite materials of the present invention comprises a directed oxidation of a molten metal.

The particular parent metal useful in the formation of composite materials by a directed oxidation comprises an aluminum parent metal which is directionally oxidized in the presence of an oxidant comprising nitrogen (e.g., a nitrogenous atmosphere) to form an aluminum nitride matrix. The directed metal oxidation reaction is conducted so that the aluminum nitride matrix grows into and embeds an appropriately selected filler material, thereby, forming a ceramic composite body. Specifically, in practicing the present invention, the aluminum parent metal is positioned adjacent to a filler material or preform such that growth of an aluminum nitride oxidation reaction product will be in a direction towards the filler material or preform so that the filler material is embedded by the growing oxidation reaction product. The positioning and orienting of the parent metal and the filler material or preform with respect to each other may be accomplished by simply embedding a body of parent metal within a particulate filler material or by positioning one or more bodies of parent metal adjacent to or in contact with a filler material or preform, or an assembly of filler materials and/or preforms. The filler materials for use with the present invention comprise any of those filler materials which exhibit a desirable synergism with an aluminum nitride matrix. Suitable morphologies for filler materials include rods, bars, wires, plates, platelets, hollow bodies, spheres, powders or other particulates, or combinations thereof. Likewise, the chemical composition of the filler material depends on the synergism which may be achieved between the filler material and the aluminum nitride matrix, as well as the ultimate desired use for the refractory material. In this regard, the filler material may have a chemical composition which is very similar to (e.g., an aluminum nitride particulate having, for example, a different morphology and/or different particle size than the aluminum nitride matrix) or very different from the aluminum nitride matrix (e.g., various oxides, borides, carbides, nitrides, etc.). Further, appropriate sizes of the filler material to be utilized depends on a number of different factors. However, certain desirable coarse grained filler materials typically have an average particle size of about 1000 microns and greater; whereas typical fine grained filler materials utilized in combination with the present invention have an average particle size of about 20 microns or less.

Additionally, the volume percent of filler provided in the matrix can range anywhere between about 20 volume percent to about 70 volume percent, the precise amount of filler utilized depending on the composition, morphology, etc., of the filler and the ultimate desired use for the refractory body.

Typically, one or more dopants are required or are desirable to promote or facilitate growth of aluminum nitride oxidation reaction product from the parent metal. The dopant or dopants (1) may be provided as alloying constituents of the parent metal, (2) may be applied to at least a portion of the surface of the parent metal, or (3) may be applied to or supplied by the filler or a part of the filler bed, or any combination of two or more techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part or the entire mass of filler in fine-droplet or particulate form, preferably in a portion of the bed of filler adjacent the parent metal. Application of any of the dopants to the filler or preform may also be accomplished by applying a layer of one or more dopant materials to and within the bed, including any of its internal openings, interstices, passageways, intervening spaces, or the like, that render it permeable. A source of the dopant may also be provided by placing a rigid body containing the dopant in contact with and between at least a portion of the parent metal surface and the filler bed. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed of filler. Additionally, dopants alloyed within the parent metal and/or externally applied to the parent metal max be augmented by dopant(s) applied to the filler bed or preform. Thus, any concentration deficiencies of the dopants alloyed within the parent metal may be augmented by additional concentration of the respective dopant(s) applied to the bed, and vice versa.

Many examples of dopant materials useful with an aluminum parent metal include sodium, lithium, calcium, boron, phosphorus, yttrium, barium, strontium, zirconium, gallium, lanthanum, titanium, chromium, cerium and nickel, which may be used individually or in combination with one or more other dopants depending on the particular oxidant utilized and the specific process conditions. With specific focus on the aluminum nitride system, particularly successful dopants for achieving growth of aluminum nitride oxidation reaction product include strontium, calcium, magnesium, cerium, lanthanum, gallium, barium and lithium. Desirable weight percents for these dopants range from about 0.1 percent by weight to about 15 percent by weight. Stated more specifically, particularly successful dopants include strontium and calcium at concentrations of from about 1 to about 7 percent by weight; lithium at concentrations of about 2–5 percent by weight; barium at concentrations of about 1–2 percent by weight; magnesium at concentrations of from about 3–6 percent by weight; cerium and lanthanum at concentrations of from about 1–5 percent by weight; and gallium at concentrations of from about 2–4 percent by weight.

The amount and type of dopants needed to formulate an aluminum nitride oxidation reaction product varies widely depending upon, for example, the processing conditions, the filler material, the processing temperature for formation of oxidation reaction product, etc. However, generally stated, an aluminum nitride oxidation reaction product can be grown at temperatures ranging from about 700° C. to about 1200° C., and more preferably at temperatures of about 900° C. to about 1050° C., in an atmosphere containing substantially pure nitrogen, or a nitrogenous atmosphere in which other non-oxidizing gases, such as hydrogen, or argon, for example, are contained.

Moreover, as stated previously, the use of additional dopant materials may be desirable to control the rate of formation of oxidation reaction product. Specifically, dopants such as silicon, germanium, magnesium and boron have proven to be useful when combined with the other dopants recited above for the growth of aluminum nitride oxidation reaction product. For example, when at least one of the dopants of strontium, calcium or lithium is utilized, it has been found that silicon concentrations ranging generally from about 0.25–5 percent by weight in combination with strontium, calcium or lithium provide for desirable aluminum nitride oxidation reaction product growth. However, a higher silicon concentration may be desirable if particular filler materials are utilized. For example, for growth of aluminum nitride into a silicon carbide filler with the use of at least one of strontium, calcium or lithium, it has been discovered that the silicon content of the second dopant is preferably within the range of 10–15 percent by weight. It has also been found that when strontium is used as a dopant, germanium functions to improve the morphology and/or uniformity of the aluminum nitride oxidation reaction product. However, as discussed above, many factors influence precise amounts and types of dopants which can successfully be combined to grow aluminum nitride oxidation reaction products.

Still further, it has been discovered that additional dopants can be utilized to modify the microstructure of the formed aluminum nitride oxidation reaction product. Specifically, dopants including nickel, iron, cobalt, titanium, copper, zinc, yttrium and zirconium at concentrations of from about 1–15 percent by weight have desirably modified the microstructure of an aluminum nitride oxidation reaction product. Specifically nickel at concentrations of from about 1–12 percent by weight; iron at concentrations of from about 1–9 percent by weight; and cobalt at similar concentrations have all produced desirable results.

Filler materials which have been found to be useful for the production of aluminum nitride ceramic matrix composite materials include AlN, TiN, BN, $Si_3N_4$, $Al_2O_3$, MgO, $ZrO_2$, alumino-silicate, $CaSiO_3$, SiC, $B_4C$, $TiB_2$ and mixtures of these compounds. Some of these filler materials, such as AlN and $TiB_2$ may be thermodynamically stable under the oxidation reaction formation conditions. However, others such as $Si_3N_4$, $B_4C$, BN, etc. may react, at least partially, with the oxidation reaction product and/or parent metal, and such reaction may have little or no effect upon the growing oxidation reaction product or may have a desirable effect.

For example, some filler materials may be active or reactive. Specific examples of an active filler material include $Si_3N_4$ and AlN. Specifically, these filler materials may serve as catalyst for the formation of aluminum nitride oxidation reaction product and/or may provide nucleation sites for the formation of aluminum nitride oxidation reaction product and thus, may increase the amount of ceramic content formed in the composite body. Further, such fillers may also promote particular crystalline orientations and morphology that may improve the properties of the composite body for particular industrial applications.

Still further, mixtures of filler materials may also result in desirable improvements in a ceramic composite body. Specifically, for example, fine grained aluminum nitride powder when added to another form of aluminum nitride filler could result in a substantial additional number of nucleation sites for the formation of aluminum nitride. Similarly, the addition of AlN powder to a filler material of different composition may also serve to increase the ceramic content of the composite, as compared to a composite which does not contain any AlN powdered filler material.

Methods of initiating the formation of oxidation reaction product may also be important. For example, in some cases the grooving of a parent metal alloy prior to melting thereof, tends to assist in the infiltration or beginning of growth of oxidation reaction product. Alternatively, the placement of another material upon the surface of the parent metal alloy may also assist in the initiation or beginning of growth of oxidation reaction product. For example, in the case of growing aluminum nitride oxidation reaction product, materials such as nickel powder, nickel aluminides, magnesium powder, aluminum powder, silicon nitride powder, zirconium powder, iron powder, nickel-chromium-aluminum powder, mixtures of oxide powders such as alumina and nickel aluminate spinel, silicon, chromium, chromium-nickel, silicon carbide and alumina have all shown, under certain conditions, to assist in the beginning or promotion of growth of aluminum nitride oxidation reaction product. These same materials may also assist in releasing the aluminum nitride oxidation reaction product matrix composite body from any parent metal carcass which may remain.

Figure 1:
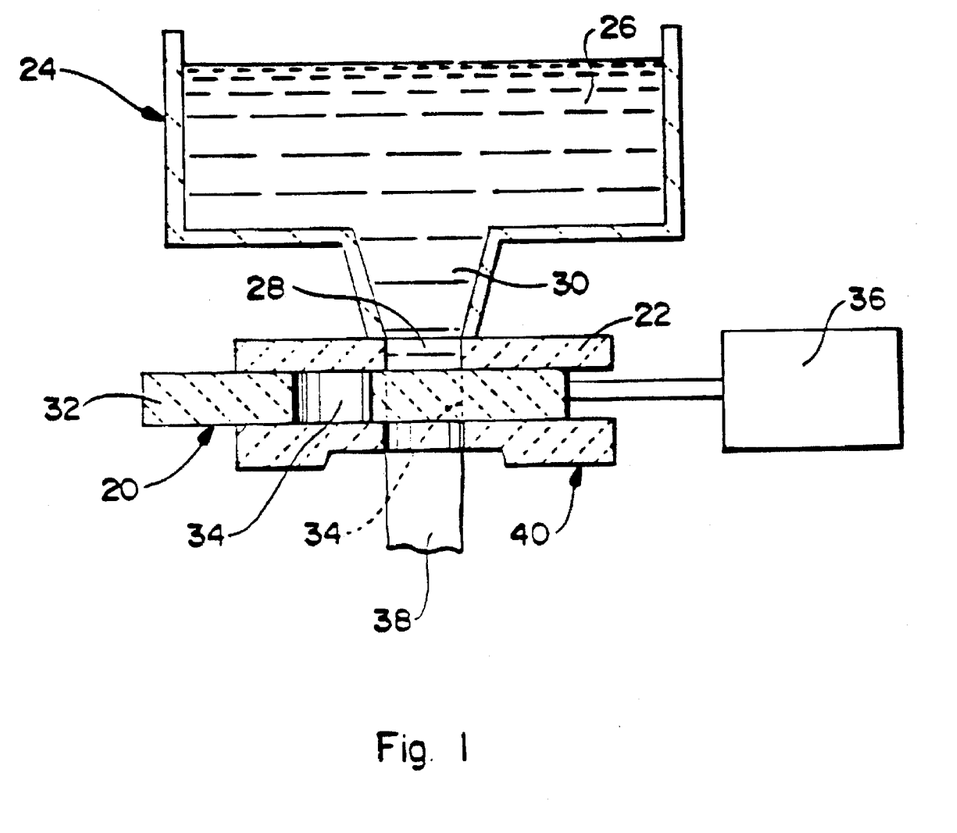
FIG. 1 is a partial schematic, vertical cross-sectional view showing a slide gate valve which is slidably disposed between a top plate of a bottom portion of a ladle and a tube holder that holds a tube through which molten metal is permitted to pass.

An exemplary use of materials produced according to the present invention, is shown in cross-section in FIG. 1. Specifically, FIG. 1 shows the utilization of ceramic composite bodies according to the present invention as slide gate valve refractories. The slide gate valve, generally illustrated as 20 in FIG. 1, contacts a top plate 22 or the bottom portion of a ladle, generally illustrated as 24, containing molten metal 26 (i.e., molten steel). Top plate 22 is integrally bound to the ladle 24 and has a top plate aperture 28 which is in direct communication with a ladle aperture 30 disposed in the bottom of the ladle 24. The slide gate valve 20 has a slide gate structure 32 with at least one slide gate aperture 34. A drive means 36, such as a throttling cylinder, or the like, is coupled to the slide gate 20 to slide (or rotate) the slide gate along the bottom surface of the top plate 22 to either align or misalign the slide gate aperture 34 with the top plate aperture 28 and the ladle aperture 30. A tube holder means, generally illustrated as 40, holds a tube 38 and supports the slide gate valve 20, the top plate 22, and the ladle 24 that is bound to the top plate 22. Tube 38 conducts the flow of molten metal 26 after the molten metal 26 leaves the ladle 24 through the slide gate 20. If the slide gate valve refractory 20 is disposed by the drive means 36 such that the aperture 34 of the slide gate valve refractory 20 is totally misaligned with top plate aperture 28 with ladle aperture 30 of the ladle 24, molten metal 26 will not flow from the ladle 24. Also, molten metal 26 will not penetrate into and through the porosity of the ceramic matrix in the structure 32 of the slide gate valve 20. When the slide gate valve 20 is slidably positioned along the top plate 22 and the bottom portion of the ladle 24 such that the slide gate aperture 34 is generally aligned with the top plate aperture 28 and with ladle of the ladle 34, molten metal 26 will flow by gravity from the ladle 34 through the respective apertures into the tube 38.

The slide gate structure 32 should be extremely flat, (e.g., to within tolerances of 1/2000 of an inch or less) and should be held tightly against the bottom surface of the top plate 22 so that molten metal will not leak out between the contacting surfaces. The slide gate structure 32, as well as the structure of the top plate 22, should be composed of refractory materials or components that are capable of being machined (such as by milling, grinding, polishing, or the like) to be relatively smooth so the structure of the top plate 22 and the structure 32 of the slide gate valve 20 cannot pull out the grains of the other during opening and closing of the slide gate valve 20 with the coupled drive means 36. Moreover, the refractory materials or components should be relatively resistive to abrasive wear which results from the components abrading against each other. The structure 32 of the slide gate valve 20 should not have pores which are too large since molten metal would penetrate the pores and weaken the structure 32. Furthermore, the slide gate structure 32 should possess extremely good thermal shock resistance and be composed of refractory materials or components that are strong enough to resist chemical corrosion and erosive effects from flowing molten metal compositions.

Various demonstrations of the present invention are included in the Examples immediately following. However, these Examples should be considered as being illustrative and should not be construed as limiting the scope of the invention as defined in the appended claims.

EXAMPLE 1

Figure 2:
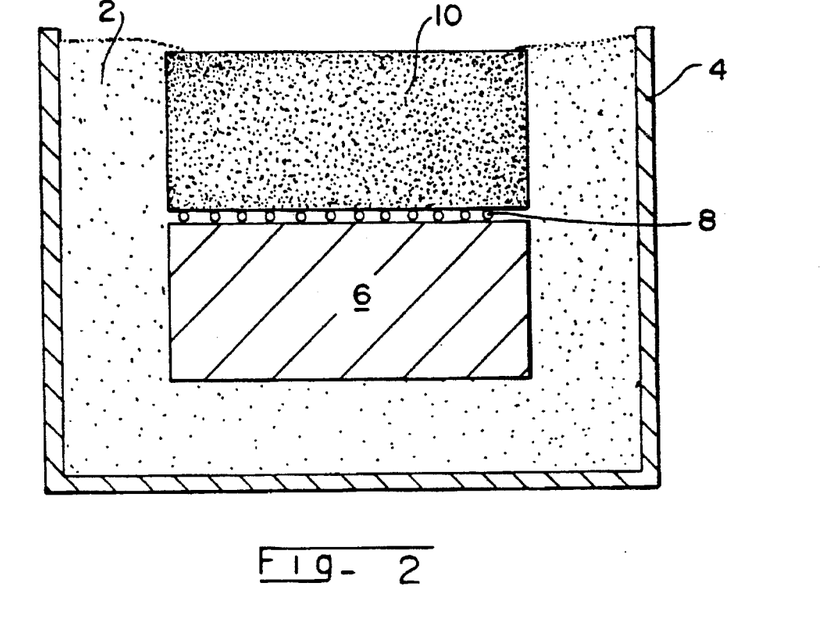
FIG. 2 is a cross-sectional schematic view of the lay-up employed in fabricating the composite body according to Example 1.

This Example demonstrates the fabrication of a refractory composite material comprising an aluminum nitride matrix reinforced with aluminum nitride, said composite being manufactured for the purpose of subsequent evaluation. FIG. 2 is a cross-sectional schematic view of the lay-up employed in fabricating the composite body.

A homogeneous mixture for dry pressing was fabricated as follows. A porcelain jar mill having an internal volume of about 4 liters was filled about half full of cylindrical alumina grinding media, each of which measured about 0.5 inch (13 mm) in diameter by about 0.5 inch (13 mm) high. A solution containing powder processing additives comprising about 200 grams of acetone, about 20 grams of Q-PAC® 40 binder (Air Products and Chemicals Inc., Emmaus, Pa.) and about 10 grams of polypropylene carbonate (Fisher Scientific, Pittsburgh, Pa.) was then added to the jar mill. After adding about 1900 grams of Grade A-200 aluminum nitride particulate (Advanced Refractory Technologies, Inc., Buffalo, N.Y.) having an average particle diameter of about 5 microns and about 100 grams of Grade S95 silicon nitride particulate (KemaNord Engineering Ceramics, Stockholm, Sweden) having an average particle diameter of about 3 microns, the jar mill was sealed and placed on a rotating mill rack for about 4 hours. The jar mill was then removed from the mill rack, opened, and the milling media were separated from the press mix by passing the press mix through a 20 mesh screen. The screened press mix was spread evenly in a stainless steel tray to a depth of about 1 inch (25 mm) and allowed to dry.

After substantially completely drying the press mix, a quantity of the mix was placed into a steel die whose cavity measured approximately 10 inches (254 mm) square by about 6 inches (152 mm) high. The quantity of mixture was such that upon pressing the leveled mixture uniaxially to an applied final pressure of about 5.2 ksi (36 MPa), the resulting dry-pressed tile measured about 1.25 inches (32 mm) thick. The pressed tile was then removed from the die, broken up and forced through an approximately 20 mesh screen to produce a granulated powder. A quantity of acetone corresponding to about 5 weight percent of the dried granulated powder was then added back to the powder. The moist granulated powder was again pressed in the same die, with an applied pressure of about 5.2 ksi (36 MPa). The uniaxially pressed tile was recovered from the die and cut roughly in half using a hack saw to produce two tiles each measuring about 10 inches (254 mm) by about 5 inches (127 mm) by about 1.25 inches (32 mm).

Next, a lay-up was prepared. In reference to FIG. 2, the construction of the lay-up began with the placing of a quantity of 37 CRYSTOLON® black silicon carbide particulate 2 (Norton Co., Worcester, Mass.) having an average particle size of about 5 microns into the bottom of a stainless steel boat 4 measuring about 12 inches (305 mm) long by about 10 inches (256 mm) wide by about 4 inches (102 mm) high to a depth of about 1 inch (25 mm). An ingot of parent metal 6 comprising by weight about 2% strontium, 1.5% silicon, 8% nickel, 0.75% magnesium and the balance aluminum and measuring about 10 inches (254 mm) long by about 5 inches (127 mm) wide by about 1.5 inches (38 mm) thick was substantially centered in the stainless steel boat 4 and placed flat on top of the layer of silicon carbide particulate 2. A dopant metal was placed onto the parent metal 6 by forming a slurry comprising by weight about 20% ethanol and the balance Type 123 nickel particulate (INCO Alloys International, Huntington, W. Va.) having substantially all particle diameters smaller than about 45 microns, and painting the slurry mixture onto the exposed top surface of the parent metal 6 using a foam brush. The slurry was then allowed to dry in air at about room temperature to form a coating 8. The uniaxially pressed tile 10 was then placed on top of the nickel particulate coating 8 in substantial conforming engagement with the coating 8 and the underlying parent metal ingot 6. The lay-up was completed by placing an additional quantity of the black silicon carbide particulate 2 into the stainless steel boat 4 around the parent metal ingot 6 and the uniaxially pressed tile 10 to a height substantially flush with the top of the tile 10, but leaving the top surface of the tile exposed.

The lay-up comprising the stainless steel boat and its contents was then placed into a retort. The retort chamber was isolated from the external environment and evacuated to about 30 inches (762 mm) of mercury vacuum. The retort Chamber was then backfilled with commercially pure nitrogen gas to about atmospheric pressure. A nitrogen gas flow rate of about 5 standard liters per minute was thereafter established. The retort chamber was then heated from about room temperature to a temperature of about 550° C. at a rate of about 35° C. per hour. After maintaining a temperature of about 550° C. for about 10 hours, the temperature was then further increased to a temperature of about 1000° C. at a rate of about 120° C. per hour. After maintaining a temperature of about 1000° C. for about 50 hours, the temperature was then decreased to a temperature of about 750° C. at a rate of about 150° C. per hour. At a temperature of about 750° C., the retort chamber was opened and the tile was removed from the lay-up and placed onto an approximately 2 inch (51 mm) thick FIBERFRAX® insulating ceramic fiber blanket (Carborundum Co., Niagara Falls, N.Y.) at approximately room temperature and allowed to cool.

After cooling to about room temperature, the tile was inspected visually, which revealed that the tile had been infiltrated with a ceramic oxidation reaction product comprising aluminum nitride to form a ceramic matrix composite comprising aluminum nitride particulate embedded by an aluminum nitride matrix along with some residual unreacted parent metal.

EXAMPLE 2

Figure 3:
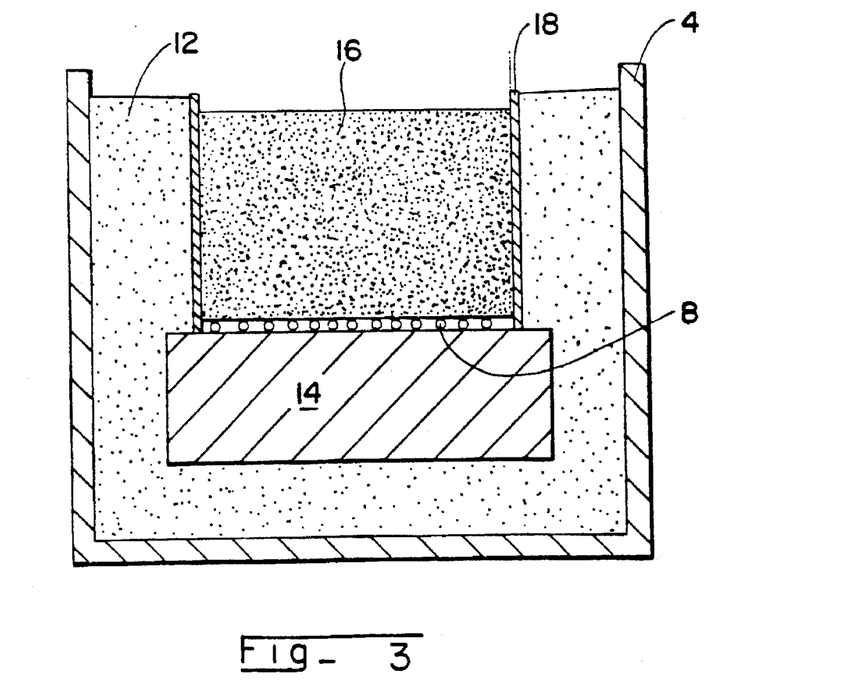
FIG. 3 is a cross-sectional schematic view of the lay-up employed in fabricating the composite body according to Example 2.

This Example demonstrates the fabrication of a refractory composite material comprising an aluminum nitride matrix reinforced with a reticulated alumina (e.g., foamed) material, said composite being manufactured for the purpose of subsequent evaluation. FIG. 3 is a cross-sectional schematic view showing the lay-up employed in fabricating this particular composite material.

The fabrication of the lay-up was as follows. In reference to FIG. 3, a quantity of Grade 4F black silicon carbide particulate 12 (Norton Co., Worcester, Mass.) having an average particle size of about 15 microns was poured into the bottom of the stainless steel boat 4 of Example 1 until a depth of about 0.5 inch (13 mm) was achieved. After leveling the mass of silicon carbide particulate 12, an ingot of parent metal 14 comprising by weight about 2% strontium, 4% silicon, 8% nickel and the balance aluminum and measuring about 5 inches (127 mm) square by about 1.5 inches (38 mm) thick was placed flat on top of the silicon carbide particulate 12 in the center of the stainless steel boat 4. A dopant metal slurry having substantially the same composition as the slurry described in Example 1, was applied to an approximately 4 inch (102 mm) square surface of the top surface of the ingot of parent metal 14 in substantially the same manner as the slurry from Example 1. The slurry was allowed to dry in air at about room temperature, leaving behind a thin coating of nickel particulate 8. A reticulated high purity alumina material 16 (Hi-Tech Ceramics, Inc., Alfred, N.Y.) in the shape of a block measuring about 4.25 inches (108 mm) square by about 1 inch (25 mm) thick and having about 10 pores per linear inch (3.9 pores/cm) was placed on top of the nickel particulate coating 8 in substantial conforming engagement therewith. A GRAFOIL® graphite foil box 18 (Union Carbide Corp., Carbon Products Division, Cleveland, Ohio) open on both ends and measuring about 4.25 inches (108 mm) square by about 1.25 inches (31 mm) high was assembled around the four rectangular faces of the reticulated alumina block 16. Specifically, the graphite foil box was fabricated from a single sheet of approximately 15 mil (0.38 mm) thick graphite foil, which was wrapped around the block 16, and the approximately 0.5 inch (13 mm) overlap was then stapled. Additional Grade 4F black silicon carbide particulate 12 was then poured into the stainless steel boat 4 around the ingot of parent metal 14 and the graphite foil box 18 to a height substantially flush with the top of the graphite foil box 18 to complete the lay-up.

The lay-up comprising the stainless steel boat and its contents was then placed into a retort. The retort chamber was then sealed to isolate the chamber from the external environment and the chamber was evacuated to about 30 inches (762 mm) of mercury vacuum and backfilled with commercially pure nitrogen to substantially atmospheric pressure. A nitrogen gas flow rate through the retort chamber of about 5 standard liters per minute was thereafter established.

The retort was then heated from about room temperature to a temperature of about 1000° C. at a rate of about 150° C. per hour. After maintaining a temperature of about 1000° C. for about 35 hours, the temperature was then decreased to substantially room temperature at a rate of about 150° C. per hour. After the retort had cooled to about room temperature, the retort chamber was opened, the lay-up was removed from the chamber and the lay-up was disassembled to reveal that a ceramic oxidation reaction product comprising aluminum nitride had grown through the reticulated alumina to produce a ceramic matrix composite material comprising the reticulated alumina material embedded by a matrix comprising aluminum nitride and some residual unreacted parent metal.

EXAMPLE 3

Figure 4:
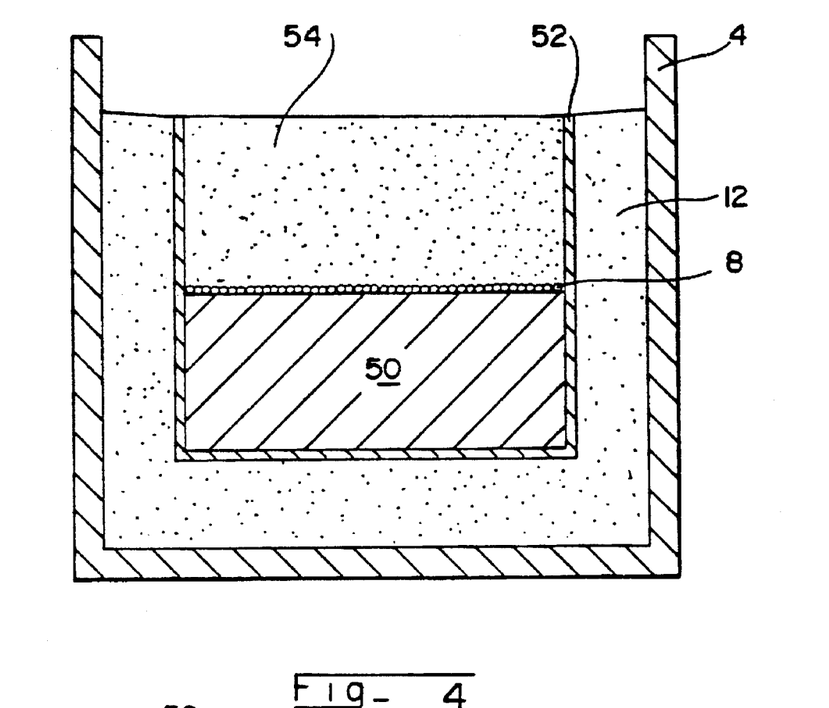
FIG. 4 is a cross-sectional schematic view of the lay-up employed in fabricating the composite body according to Example 3.

This Example demonstrates the fabrication of a refractory composite material comprising an aluminum nitride matrix reinforced with magnesium oxide particulate, said composite being manufactured for the purpose of subsequent evaluation. FIG. 4 shows a cross-sectional schematic view of the lay-up used to fabricate this composite material.

A lay-up was fabricated as follows. In reference to FIG. 4, quantity of Grade 4F black silicon carbide particulate 12 (Norton Co., Worcester, Mass.) having an average particle size of about 15 microns was poured into the stainless steel boat 4 of Example 1 to a depth of about 1 inch (25 mm) and leveled. An ingot of a parent metal 50 comprising by weight about 2% strontium, 4% silicon, 8% nickel and the balance aluminum and measuring about 4 inches (102 mm) square by about 1.5 inches (38 mm) thick was coated on one of its square faces with the dopant metal slurry to form a thin coating 8, which was described in Example 1. A GRAFOIL® graphite foil box 52 (Union Carbide Corp., Carbon Products Division, Cleveland, Ohio) open on one end and measuring about 4 inches (102 mm) square by about 2.75 inches (70 mm) deep was assembled around five surfaces of the ingot of parent metal 50, leaving the surface coated with the nickel particulate B exposed. The graphite foil box 52 was assembled from a single sheet of approximately 15 mil (0.38 mm) thick graphite foil, which was fabricated into a box configuration by making strategically placed cuts and folds and stapling the folds together to make the box self-supporting.

The graphite foil box 52 and the coated ingot of parent metal 50 contained therein, were then placed into the stainless steel boat 4 on top of the layer of black silicon carbide particulate material 12. A loose particulate filler material 54 comprising Grade DSP calcined magnesium oxide (−6 +14 grit, North American Refractories Co., Cleveland, Ohio) having substantially all particle diameters between about 2100 microns and about 3400 microns and which had previously been fired in air for about 5 hours at a temperature of about 1200° C. was poured into the graphite foil box 52 on top of the coated ingot of parent metal 50 to a height substantially flush with the top of the box 52 and leveled. Additional Grade 4F black silicon carbide particulate 12 was then poured into the stainless steel boat 4 around the graphite foil box 52 to a height substantially flush with the top of the graphite foil box to complete the lay-up.

The lay-up was then thermally processed in substantially the same manner under substantially the same atmospheric conditions as was the lay-up in Example 2 with the exception that the dwell time at a temperature of about 1000° C. was for about 100 hours instead of about 35 hours.

Once the retort had cooled to about room temperature, the chamber was opened, the lay-up was removed and the lay-up was disassembled to reveal that a ceramic oxidation reaction product had grown through the magnesium oxide filler material to produce a ceramic matrix composite comprising magnesium oxide particulate embedded by a matrix comprising aluminum nitride and some residual parent metal.

EXAMPLE 4

Figure 5:
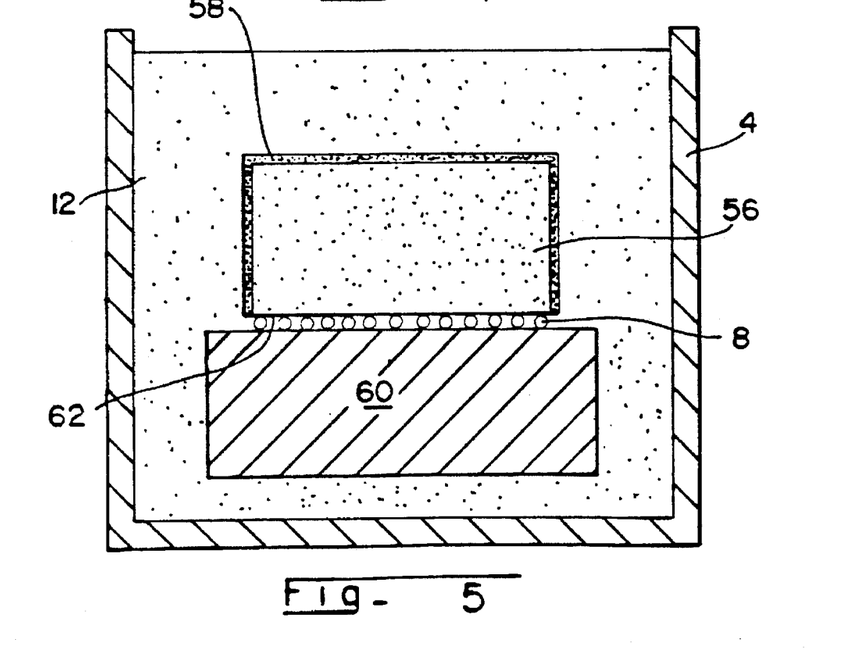
FIG. 5 is a cross-sectional schematic view of the lay-up employed in fabricating the composite body according to Example 4.

This Example demonstrates the fabrication of a refractory composite material comprising an aluminum nitride matrix reinforced with aluminum nitride particulate, said composite being manufactured for the purpose of subsequent evaluation. FIG. 5 is a cross-sectional schematic view of the lay-up used to fabricate the ceramic composite.

A preform 56 measuring about 4 inches (102 mm) square by about 1.3 inches (33 mm) thick and comprising Grade A-200 aluminum nitride particulate (Advanced Refractory Technologies Company, Buffalo, N.Y.) having an average particle size of about 5 microns was fabricated in substantially the same manner as was the preform of Example 1. A slurry comprising by weight about 33% Grade A-1000 alumina particulate (Alcoa Industrial Chemicals Division, Bauxite, Ark.) having an average particle diameter of about 3.5 microns, about 0.3% HYPERMER® KD2 dispersant (ICI Americas, Inc., Wilmington, Del., and the balance ethanol was applied to all surfaces of the preform 56, except one of the 4 inch (102 mm) square faces. The slurry was applied with a foam brush and allowed to dry in air at about room temperature to form a barrier layer 58 comprising alumina particulate.

A lay-up was then assembled as follows. A quantity of Grade 4F black silicon carbide particulate 12 (Norton Co., Worcester, Mass.) having an average particle size of about 15 microns was poured into the bottom of the stainless steel boat 4 described in Example 1 to a depth of about 1 inch (25 mm) and leveled. An ingot of a parent metal 60 comprising by weight about 2% strontium, 4% silicon, 8% nickel, 2% magnesium and the balance aluminum and measuring about 4 inches (102 mm) long by about 4 inches (102 mm) wide by about 1.5 inches (38 mm) thick was placed flat on top of the layer of silicon carbide particulate 12 and centered in the stainless steel boat 4. The dopant layer comprising nickel particulate 8 was then applied to the top surface of the parent metal ingot 60 in substantially the same manner as was the layer which was applied in Example 1 and allowed to air dry. The coated preform 56 was then contacted with the coated ingot of parent metal 60 such that the uncoated face 62 of the preform 56 contacted the nickel particulate coating 8 on the surface of the ingot 60. Additional black silicon carbide particulate 12 was then placed into the stainless steel boat 4 surrounding the ingot of parent metal 60 and the preform 56 such that the top of the preform was covered with the silicon carbide to a depth of about 1 inch (25 mm). This filling of the stainless steel boat 4 with the silicon carbide particulate 12 thus completed the lay-up.

The lay-up comprising the stainless steel boat and its contents was then placed into a retort. The lay-up was then thermally processed under the same atmospheric conditions and according to nearly the same heating schedule as was the lay-up of Example 1. The difference between the two heating schedules was that in the present Example, the retort was opened at a temperature of about 700° C. instead of at about 750° C. for the withdrawing and disassembling of the lay-up, and the initial ramp rate was about 50° C. per hour instead of about 35° C. per hour. Specifically, the preform was removed from the pool of molten parent metal and placed onto an approximately 2 inch (51 mm) thick FIBER-FRAX® ceramic fiber blanket (Carborundum Co., Niagara Falls, N.Y.) at approximately room temperature and allowed to cool. After cooling to substantially room temperature, the barrier layer 58 on the preform 56 was physically removed to reveal that a ceramic matrix comprising aluminum nitride had grown into the aluminum nitride filler material. The ceramic matrix composite thus produced comprised aluminum nitride particulate embedded by a matrix comprising aluminum nitride and some residual unreacted parent metal.

EXAMPLE 5

This Example demonstrates the fabrication of a refractory composite material comprising an aluminum nitride matrix reinforced with aluminum nitride and titanium diboride, said composite being manufactured for the purpose of subsequent evaluation. The lay-up geometry for fabricating this ceramic composite was substantially the same as that shown in FIG. 5.

A permeable preform comprising an approximately equal weight ratio of Grade A-200 aluminum nitride particulate (Advanced Refractory Technologies Company, Buffalo, N.Y.) having an average particle diameter of about 5 microns and Grade HCT 30 titanium diboride platelets (Union Carbide Corp., Cleveland, Ohio) having an average particle diameter of about 10 microns was fabricated by substantially the same dry pressing operation using substantially the same powder processing additives and procedures as was used in making the preform described in Example 1. The overall dimensions of the preform as pressed were about 4 inches (102 mm) square by about 1.25 inches (32 mm) thick.

The dry pressed preform was then coated with substantially the same barrier material in substantially the same manner as was the preform in Example 4.

The lay-up was assembled in substantially the same manner as was the lay-up in Example 4. The ingot of parent metal, however, comprised by weight about 2% strontium, 1.5% silicon, 8% nickel, 0.5% magnesium and the balance aluminum. A dopant layer comprising nickel particulate was applied to the top surface of the ingot. The dopant layer was of substantially the same composition and was applied in substantially the same manner as was the dopant layer of Example 1.

The lay-up comprising the stainless steel boat and its contents was then placed into a retort. The lay-up was then thermally processed under the same atmospheric conditions and according to nearly the same heating schedule as was the lay-up of Example 4. The difference between the two heating schedules was that in the present Example, the dwell time at a temperature of about 1000° C. was about 100 hours instead of about 50 hours.

After thermal processing, the lay-up was removed from the retort and disassembled in substantially the same manner as was the lay-up in Example 4, and upon cooling to room temperature, the barrier coating was removed from the preform to reveal that a ceramic matrix had grown through the aluminum nitride and titanium diboride filler materials to produce a ceramic matrix composite. Specifically, the ceramic composite comprised the aluminum nitride and titanium diboride filler materials embedded by a ceramic matrix comprising aluminum nitride with some residual unreacted parent metal incorporated therein.

EXAMPLE 6

This Example demonstrates the fabrication of another refractory composite material comprising an aluminum nitride ceramic matrix reinforced with aluminum nitride and titanium diboride filler materials, said composite being manufactured for the purpose of subsequent evaluation. The lay-up employed for fabricating the ceramic composite is substantially the same as that shown in FIG. 5.

This run was identical in almost every respect to the run described in Example 5. The only significant difference in this run over that described in Example 5 was that the weight ratio of the aluminum nitride particulate to the titanium diboride particulate in the preform was about 3 to 1 instead of about 1 to 1. After assembling and thermally processing the lay-up in substantially the same manner in substantially the same atmosphere as the lay-up described in Example 5, the lay-up was disassembled to reveal that a ceramic matrix had grown through the permeable preform to produce a ceramic matrix composite. Specifically, the ceramic matrix composite comprised the aluminum nitride and titanium diboride filler materials embedded by a ceramic matrix comprising aluminum nitride and some residual unreacted parent metal.

Testing of the Produced Materials

The following tests were used selectively to characterize each of the above composite materials under conditions which were intended to simulate those conditions to which a refractory material might actually be exposed. Three specific tests were performed.

These tests are described with particularity in the sections which follow, but the tests may be briefly summarized as follows. The corrosion test measured the ability of the material to withstand a molten steel environment. The environment chosen was particularly aggressive in that the protective slag layer on top of the melt contained calcium and manganese, two elements which readily corrode alumina-bearing refractories, a class of refractories which are frequently used in molten steel environments. The other two tests, the spalling test and the flame shock test, gauge a refractory material's resistance to thermal shock. The flame shock is frequently used as a screening test, but the spalling test is the more severe of the two, and furthermore, gives an indication of the resistance of the refractory to wetting and adhesion by the steel.

The refractory materials were evaluated qualitatively against a leading refractories manufacturer's best refractory for the particular test.

Corrosion Test

A sample of the refractory material was cut using a diamond saw into the shape of a right rectangular prism having a cross-section of about 1 inch (25 mm) square and a length of about 9 inches (229 mm). After cleaning and drying the sample bar, the bar was mounted into a holder which in turn was placed above a pool of molten steel having a protective slag coating on its surface. The bar was held above the surface of the molten steel and slag for the express purpose of preheating the sample bar to the approximate temperature of the pool of steel and slag. The steel comprised Sorel F-1 pig iron having a nominal composition of about 4.26% carbon, about 0.15% silicon, about 0.01% manganese, about 0.03% phosphorus, about 0.015% sulfur and the balance iron. The surface slag comprised by weight about 33.6% CaO, about 22.5% $Fe_3O_4$, about 15.7% $MnO_2$, about 13.3% $CaF_2$, about 9.0% $SiO_2$, about 2.6% $Al_2O_3$, about 1.7% MgO, about 1.0% $Fe_2O_3$ and about 0.6% $SO_3$. The temperature of the molten steel/slag bath ranged from about 1610° C. to about 1620° C.

After preheating the test bar above the molten steel/slag bath for about 5 minutes, the bar was immersed into the molten pool and rotated within the pool for about 30 to 45 minutes. The test bar was then removed from the molten pool of steel and slag and allowed to cool. The bar was then examined visually for signs of surface cracking. The bar was then sectioned longitudinally using a diamond saw and the corrosion of the specimen was measured by measuring the thickness of the thinnest cross-section remaining after the test.

Spalling Test

The refractory material was machined using a diamond saw into the shape of a plate measuring about 4 inches (102 mm) square by about 1 inch (25 mm) thick. After cleaning and drying the machined test specimen plate, a refractory brick having an approximately 1 inch (25 mm) diameter hole extending completely through the brick was placed on top of the test specimen plate such that the center of one of the 4 inch (102 mm) square faces of the plate was left exposed through the hole in the refractory brick. The unit comprising the test specimen plate and the refractory brick were then clamped together and placed into a bedding of sand to a depth such that the sand was substantially flush with the top of the refractory brick. A quantity of molten steel having substantially the same chemical composition as that described in the preceding section (under the heading "Corrosion Test") and at substantially the same temperature as the aforementioned steel was then poured into the cavity in the refractory brick, substantially filling the cavity. The molten steel, which was in contact with the refractory brick and the exposed portion of the test plate, was then allowed to cool and solidify. After cooling the unit and the steel introduced thereto to about room temperature, the refractory brick was removed using hammer blows and the test specimen plate was examined visually to assess the results of exposure to the molten steel. The points of specific interest were whether or not the test plate had bonded to the steel and whether the thermal shock of exposure to the molten steel had cracked the plate.

Flame Shock Test

A test specimen having substantially the same dimensions as the specimen used in the spalling test was embedded in a body of sand such that the surface of the sand was substantially flush with the top surface of the test plate. An oxygen-propane flame was then positioned over the exposed face of the test plate such that the torch tip resided approximately 0.25 inch (6 mm) from the surface of the plate. The oxy-propane torch was then ignited and the approximately 1600° C.–1700° C. flame was traversed across the test plate at a rate of about 4 inches (102 mm) per minute. The flame impinged directly on the surface of the test plate.

After the oxy-propane flame had traversed substantially the entire distance across the test plate, the flame was extinguished and the test plate was allowed to cool. After the test plate had cooled to about room temperature, the surface of the plate was examined visually. The visual inspection comprised characterizing the number and severity of any cracks which may have formed as a result of this thermal shock.

Test Results

A qualitative summary of the various tests performed on the refractory composite materials described herein is shown in Table I.

The refractory material of Example 1 was subjected to the corrosion test and the spalling test. In the corrosion test, the Example 1 material was preheated above the pool of molten steel and slag for about 20 minutes rather than the standard 5 minutes. The visual inspection following the test revealed no sign of any cracking. Furthermore, residual steel did not appear to be adhered to the surface of the test specimen to any substantial extent. The degree of corrosion of the specimen was determined to be only about one third that of the standard reference refractory material. In the spalling test, this material showed severe cracking from the shock of the sudden contact of molten steel against the approximately room temperature test specimen. About seven cracks were observed radiating outward from the center of the test plate.

Visual inspection revealed that the steel had penetrated these cracks. Accordingly, this material may be selectively used for certain refractory applications.

The Example 2 material was subjected to the flame shock test and the spalling tests, as the material was too brittle to be machined into bars for corrosion testing. Visual inspection of the test plate following the flame shock test revealed only very fine surface cracks. The thermal shock resulting from the spalling test, however, resulted in cracks that were visible through the thickness of this reticulated alumina reinforced aluminum nitride ceramic composite material, resulting in a very weak structure. Accordingly, this material may be selectively used for certain refractory applications.

The Example 3 material was also initially subjected to the flame shock test. In the flame shock test, this magnesium oxide reinforced aluminum nitride ceramic composite exhibited similar behavior to the Example 2 candidate material; only very fine surface cracks were observed visually. Because of its good performance in the screening test, this material was then tested in the corrosion and spalling tests where it likewise gave good results. Particularly, the material showed only small surface cracks as a result of the spalling test. This particular refractory material performed the best of any of the materials tested.

TABLE I

RELATIVE PERFORMANCE OF CANDIDATE REFRACTORY MATERIALS*

| MATERIAL | CORROSION TEST | FLAME SHOCK TEST | SPALLING TEST |
| --- | --- | --- | --- |
| Example 1 | Good | Good | Poor |
| Example 2 | — | Good | Poor |
| Example 3 | Good | Good | Good |
| Example 4 | — | Poor | — |
| Example 5 | Good | Good | Poor |
| Example 6 | Good | Good | Poor |

*Compared to one refractories manufacturer's best material for each test.

The aluminum nitride reinforced aluminum nitride composite material of Example 4 was subjected to the flame shock test and exhibited rather poor thermal shock resistance. Specifically, as a result of this thermal shock, the test plate cracked catastrophically into about four pieces. Consequently, further testing of this material was deferred.

The two titanium diboride/aluminum nitride reinforced aluminum nitride matrix composite materials were each subjected to all three tests, and both materials exhibited similar behavior in each test. Specifically, these candidate materials were virtually unaffected by the flame shock test. Only a slight discoloration of the surface of the test plate was observed; no cracking of these materials was evident. The thermal shock of the spalling test, however, was again too severe for these composites, with each test plate fracturing into 3 to 4 fragments as a result. In contact with the molten steel and slag, these two composites showed good corrosion resistance, comparable to one refractories manufacturer's best performing refractory for this test. Accordingly, these materials may be selectively used for certain refractory applications.

EXAMPLE 7

This Example demonstrates the fabrication of another refractory composite material comprising an aluminum nitride matrix reinforced with magnesium oxide particulate. The lay-up employed in fabricating this composite material was substantially the same as that shown in FIG. 5 except that the preform did not contain a barrier layer coated thereon.

A slurry comprising by weight about 0.9% Q-PAC® 40 binder (Air Products and Chemicals, Inc., Emmaus, Pa.), about 8.9% acetone and the balance Grade DSP calcined magnesium oxide (−14 +28 mesh, North American Refractories Co., Cleveland, Ohio) having substantially all particle diameters between about 1000 microns and about 2100 microns was ball milled in substantially the same manner as was the slurry described in Example 1. After ball milling, however, the slurry was not poured through a screen and into a tray and allowed to dry, but rather was poured into the approximately 4.25 inch (108 mm) square cavity of a Grade GI-1000 silicone rubber mold (Plastic Tooling Supply Co., Exton, Pa.). Specifically, the rubber mold rested on a flat rigid aluminum plate which in turn lay on top of a level vibrating table. The vibrating table was turned on and the slurry (minus the milling media) was poured into the mold in a smooth and continuous manner. The mold and its contents were subjected to vibration for at least about 1 hour to condense the slurry into a preform, with excess surface liquid being removed with a sponge. The vibrating table was turned off and the residual acetone was allowed to evaporate from the preform in air at about room temperature. After substantially all of the acetone had evaporated, an approximately 1.5 inch (38 mm) thick preform was recovered from the silicone rubber mold.

A lay-up was then assembled in substantially the same manner in was described in Example 4 with the exception that the ingot of parent metal used in the present Example comprised by weight about 3% strontium, 1.5% silicon, 8% nickel, 0.5% magnesium and was of a thickness such that the weight of the ingot equaled the weight of the preform comprising magnesium oxide.

The lay-up comprising the stainless steel boat and its contents was then placed into a retort. The retort chamber was then sealed to isolate the chamber from the external environment and the chamber and its contents were evacuated to about 30 inches (762 mm) of mercury vacuum and then backfilled with commercially pure nitrogen to substantially atmospheric pressure. A nitrogen gas flow rate through the retort of about 5 standard liters per minute was thereafter established.

The retort was then heated from about room temperature to a temperature of about 550° C. at a rate of about 50° C. per hour. After maintaining a temperature of about 550° C. for about 10 hours, the temperature was then further increased to a temperature of about 1000° C. at a rate of about 150° C. per hour. After maintaining a temperature of about 1000° C. for about 150 hours, the temperature was then decreased at a rate of about 150° C. per hour. After the retort and its contents had cooled to substantially room temperature, the retort chamber was opened, the lay-up was removed from the chamber and the lay-up was disassembled to reveal that a ceramic oxidation reaction product comprising aluminum nitride had grown through the preform comprising magnesium oxide to produce a ceramic matrix composite material comprising the magnesium oxide particulate embedded by a matrix comprising aluminum nitride and some residual unreacted parent metal.

The refractory character of this composite material was not evaluated, however, the refractory properties should be excellent.

EXAMPLE 8

This Example demonstrates the use of various parent metal compositions for the fabrication of additional candidate refractory composite materials comprising an aluminum nitride matrix reinforced with magnesium oxide aggregate.

Samples A-C

Each lay-up was assembled in substantially the same manner as was described in Example 3 and depicted in FIG. 4 with the following exceptions: the loose particulate filler material 54 comprised magnesium oxide aggregate (Martin Marietta Magnesia Specialties, Inc., Hunt Valley, Md.), the aggregate having an average size of about 0.25 inch (6300 microns); the magnesium oxide filler material was poured into the GRAFOIL® graphite foil box 52 (Union Carbide Co.) to a depth of about 1.5 inches (37 mm); the composition of the parent metal ingot 50 used in the present Example differed from that of Example 3, and each composition is specifically reported in Table II; before its incorporation into the lay-up, the magnesium oxide aggregate 54 was fired in air at a temperature of about 500° C. for about 10 hours to remove as much absorbed and chemically bound water as possible; an approximately 1 inch (25 mm) thick layer of CERABLANKET® ceramic fiber insulation (Manville Refractory Products, Denver, Colo.) was placed inside the stainless steel boat 4 on top of the layer of silicon carbide particulate 12 and the magnesium oxide filler material 54; and the GRAFOIL® graphite foil box 52 extended only partially down the sides of the ingot of parent metal 50, the box 52 did not cover the bottom face of the ingot 50.

Each fabricated lay-up was then thermally processed in substantially the same manner as was described in Example 2 with the following exceptions: the retort and its contents were heated from about room temperature to a temperature of about 200° C. before the retort chamber was evacuated to about 30 inches (762 mm) of mercury vacuum and subsequently backfilled with commercially pure nitrogen gas to substantially atmospheric pressure, and the retort and its contents were then heated from the temperature of about 200° C. to a temperature of about 850° C., which temperature was maintained for about 15 hours, before cooling back to about room temperature at a rate of about 150° C. per hour.

Each lay-up was removed from the retort chamber and disassembled in substantially the same manner as described in Example 3 to reveal that an aluminum nitride oxidation reaction product had grown at least partially through the magnesium oxide filler material to produce a composite body comprising magnesium oxide aggregate embedded by a matrix comprising aluminum nitride and residual unreacted aluminum parent metal.

This Example therefore demonstrates that a relatively coarse magnesium oxide filler material may be infiltrated with an oxidation reaction product comprising aluminum nitride to form a composite body. Moreover, this Example demonstrates that the oxidation reaction product can grow to a relatively large thickness in a relatively short amount of time.

TABLE II

| Sample | Parent Metal |
| --- | --- |
| A | Al-1 Sr-1 Mg |
| B | Al-0.5 Sr-1 Mg |
| C | Al-0.5 Sr-3 Mg |

We claim:
1. A slide gate component, comprising:
   a ceramic composite plate having substantially parallel faces and an aperture therethrough, said ceramic composite plate consisting essentially of:
   at least one filler material selected from the group consisting of TiN, $Si_3N_4$, $Al_2O_3$, MgO, $ZrO_2$, $CaSiO_3$, alumino-silicate, $B_4C$ and $TiB_2$; and an aluminum nitride matrix comprising crystallites having random crystallographic orientation with respect to one another as characteristic of a densification technique comprising sintering, hot pressing or hot isostatic pressing.

2. The slide gate component of claim 1, further comprising impurities at grain boundaries between adjacent crystallites of said aluminum nitride matrix, said impurities being characteristic of said densification technique.

3. A refractory ceramic composite material, comprising:
at least one filler material selected from the group consisting of TiN, $Si_3N_4$, $Al_2O_3$, MgO, $ZrO_2$, $CaSiO_3$, alumino-silicates, $B_4C$ and $TiB_2$; and
a matrix comprising polycrystalline AlN having a randomized crystallographic orientation.

4. The refractory ceramic composite material of claim 3 wherein said filler material comprises at least one material selected from the group consisting of $Al_2O_3$, MgO and $TiB_2$.

5. The refractory ceramic composite material of claim 3, wherein said filler material comprises bodies having an average size in the range of about 5 to about 2100 microns.

6. The refractory ceramic composite material of claim 3, comprising from about 20 to about 70 percent by volume of said at least one filler material.

7. The refractory ceramic composite material of claim 3, wherein said filler material comprises a coarse grained particulate.

8. The refractory ceramic composite material of claim 3 fabricated as at least one body comprising a lining for a furnace, a ladle shroud or a tundish.

9. The refractory ceramic composite material of claim 3, wherein said filler material comprises at least one material selected from the group consisting of TiN and $Si_3N_4$.

10. A method for throttling flow of molten metal, comprising:
attaching a slide gate system to a means for confining said molten metal, said slide gate system comprising at least two plates each having at least one orifice, the plates residing in planar contact and being translatable with respect to one another so that said orifices move into and out of alignment, whereby said molten metal is transported past said slide gate system only by passing through said orifices, at least one of said plates comprising a ceramic composite body comprising:
at least one filler material; and
a matrix comprising aluminum nitride, wherein said ceramic composite body is produced by a densification process comprising sintering, hot pressing or hot isostatic pressing, thereby producing a matrix microstructure consisting essentially of randomly oriented crystallites of said aluminum nitride.

11. The method of claim 10, wherein at least one grain boundary is present between adjacent crystallites of said matrix and wherein said grain boundary comprises an impurity phase characteristic of said densification process.

12. The method of claim 10, wherein said filler material comprises at least one material selected from the group consisting of oxides, borides, carbides, silicon nitride and titanium nitride.

13. The method of claim 10, wherein said filler material comprises at least one material selected from the group consisting of aluminum oxide, titanium diboride, titanium nitride, boron nitride, silicon nitride, zirconium dioxide, alumino-silicate, calcium silicate, silicon carbide and boron carbide.

14. The method of claim 10, wherein said metal comprises at least one metal selected from the group consisting of steel, aluminum, bronze, copper and iron.

15. The method of claim 10, wherein said at least one orifice is moved by at least one movement of at least one of said plates comprising sliding or rotating.

16. The method of claim 10, wherein said filler material has a morphology comprising rods, bars, wires, plates, platelets, hollow bodies, spheres, powders, particulates, fibers, chopped fibers, whiskers, fiber mats, flakes, bubbles or microspheres.

17. A refractory article comprising a ceramic composite body for use in direct contact with molten metals and glasses, said article comprising a furnace lining, a slide gate component, a subentry nozzle, a ladle shroud or a tundish, wherein said ceramic composite body comprises:
from about 20 to about 70 percent by volume of at least one filler material; and
a matrix comprising crystallites of aluminum nitride, wherein said crystallites have a randomized crystallographic orientation.

18. The refractory article of claim 17, wherein said molten metals and glasses are produced in a continuous manner.

19. The refractory article of claim 17, wherein said filler material comprises at least one material selected from the group consisting of aluminum oxide, magnesium oxide and titanium diboride.

20. The refractory article of claim 17, wherein said filler material comprises at least one material selected from the group consisting of oxides, nitrides, borides and carbides.

21. The slide gate component of claim 1, wherein said at least one filler material comprises a material selected from the group consisting of $Si_3N_4$, $B_4C$ and $TiB_2$.

22. The slide gate component of claim 1, wherein said at least one filler material comprises a material selected from the group consisting of $Al_2O_3$, MgO and $ZrO_2$.

23. The slide gate component of claim 1, wherein said at least one filler material comprises a plurality of bodies having a size ranging from about 5 microns to about 6300 microns.

24. The slide gate component of claim 23, wherein said bodies have a size ranging from about 20 microns to about 1,000 microns.

25. The refractory ceramic composite material of claim 15, wherein said bodies have an average size in the range of about 20 microns to about 1,000 microns.

26. The refractory ceramic composite material of claim 3, wherein said filler material comprises bodies having an average size ranging from about 1000 microns to about 2100 microns.

27. The refractory ceramic composite material of claim 3, wherein said filler material comprises at least one material selected from the group consisting of $ZrO_2$ and $B_4C$.

28. The method of claim 10, wherein said at least one material comprises bodies having an average size ranging from about 5 microns to about 6300 microns.

29. The method of claim 10, wherein said ceramic composite body comprises from about 20 to about 70 percent by volume of said at least one filler material.

30. The refractory article of claim 17, wherein said filler material comprises at least one material selected from the group consisting of zirconium dioxide and boron carbide.

31. The refractory article of claim 17, wherein said at least one filler material comprises bodies having an average size ranging from about 5 microns to about 6300 microns.

32. The refractory article of claim 31, wherein said bodies have an average size ranging from about 20 microns to about 1000 microns.

33. The refractory article of claim 31, wherein said bodies have an average size ranging from about 1000 microns to about 2100 microns.

34. The refractory article of claim 31, wherein said bodies have an average size ranging from about 2100 microns to about 3400 microns.

* * * * *